United States Patent [19]

Deckman et al.

[11] 4,380,855
[45] Apr. 26, 1983

[54] METHOD FOR FILLING HOLLOW SHELLS WITH GAS FOR USE AS LASER FUSION TARGETS

[75] Inventors: Harry W. Deckman, Fanwood; Gerald M. Halpern, Bridgewater; John G. Dunsmuir, Madison, all of N.J.

[73] Assignee: University of Rochester, Rochester, N.Y.

[21] Appl. No.: 113,146

[22] Filed: Jan. 18, 1980

[51] Int. Cl.³ .............................................. G21C 21/00
[52] U.S. Cl. ...................................... 29/407; 29/559; 65/34; 219/121 LL; 356/361; 376/152
[58] Field of Search .................... 29/407, 559; 53/403; 219/121 LL; 65/34; 176/1, 91 SP; 356/361; 376/152

[56] References Cited

U.S. PATENT DOCUMENTS

| | | | |
|---|---|---|---|
| 2,256,804 | 9/1941 | Hurley | 356/361 |
| 2,736,143 | 2/1956 | Ford | 65/34 |
| 2,762,954 | 9/1956 | Leifer | 29/424 |
| 3,426,170 | 2/1969 | Miller | 219/74 |
| 3,668,283 | 6/1972 | Moreau | 176/91 SP |
| 3,778,126 | 12/1973 | Wilson | 316/20 |
| 3,826,634 | 7/1974 | Blust et al. | 65/34 |
| 3,899,681 | 8/1975 | Beckner | 176/1 |
| 3,914,000 | 10/1975 | Beckerman et al. | 53/403 |
| 3,953,617 | 4/1976 | Smith et al. | 176/1 |
| 4,034,032 | 7/1977 | Hendricks | 264/28 |
| 4,088,864 | 5/1978 | Theeuwes et al. | 219/121 LL |
| 4,188,532 | 2/1980 | Deckman et al. | 176/1 |

FOREIGN PATENT DOCUMENTS

| | | | |
|---|---|---|---|
| 1208014 | 12/1965 | Fed. Rep. of Germany | 176/91 SP |
| 1597945 | 6/1970 | France | 176/91 SP |

*Primary Examiner*—Daniel C. Crane
*Attorney, Agent, or Firm*—Martin LuKacher

[57] ABSTRACT

Hollow shell laser fusion targets, such as glass microballoons, are filled with gases of the type which do not permeate through the wall of the balloon. A hole is laser-drilled in the balloon, a plug is placed over the hole and gas is introduced into the balloon through the loosely plugged hole. Thereafter the plug is melted to form a seal over the hole, entrapping the gas within the target. The plug is, for example, a polymer such as highly crystalline polystyrene, or glass.

16 Claims, 10 Drawing Figures

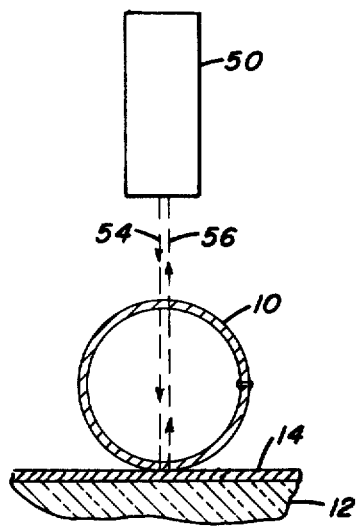
FIG. 7
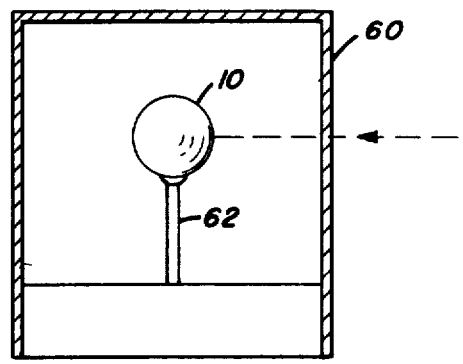
FIG. 8
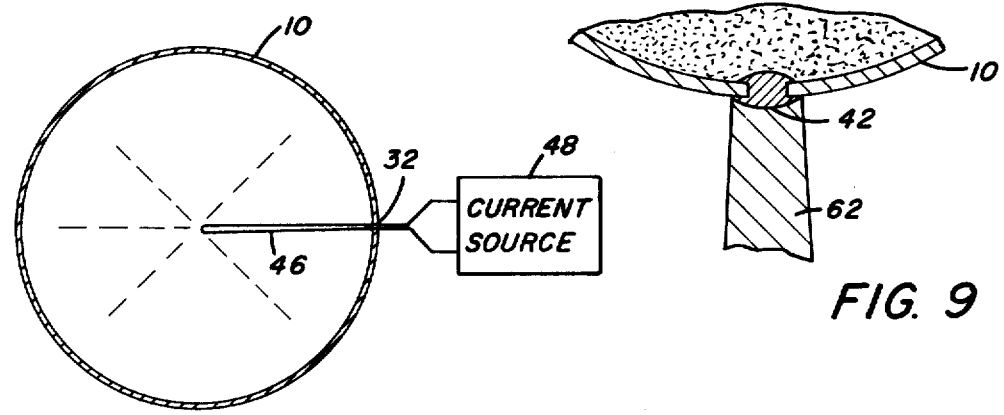
FIG. 10
FIG. 9

METHOD FOR FILLING HOLLOW SHELLS WITH GAS FOR USE AS LASER FUSION TARGETS

DESCRIPTION

The present invention relates to methods for filling hollow shells with gas and in particular to a method for filling hollow glass shells with gases which do not readily diffuse through the glass walls of the shells.

The invention is especially suitable for use in making laser fusion targets. Such targets are mounted in a target chamber and illuminated with a high power laser.

Previously, glass microballoon laser fusion targets (see U.S. Pat. No. 4,034,032 issued July 5, 1977) have been filled with gases which can permeate or diffuse through the glass walls of the microballoons. Only light gases such as neon, hydrogen and helium and the isotopes thereof can readily diffuse through the glass walls of the microballoon. Filling with other gases by diffusion is difficult or impossible. It is nevertheless desirable to provide microballoon laser fusion targets filled with gases such as argon, deuterium sulphide and xenon, either alone or in mixtures with the lighter gases mentioned above in order to provide laser fusion targets. Such targets have particular utility in studies of the effects of high energy laser radiation particularly as such effects occur during the laser fusion process.

Accordingly, it is an object of the present invention to provide an improved method of filling or charging hollow shells such as glass microballoons with gases and particularly such gases as do not readily diffuse through the shell.

It is a further object of the present invention to provide an improved method of filling glass microballoons having diameters in the range of 20 to 400 micrometers (um) which does not rely on the permeability characteristics of the glass walls of such microballoons.

It is a further object of the present invention to provide an improved method of filling glass microballoons with minimum perturbation of the surface finish and geometry of the balloons.

It is a still further object of the present invention to provide an improved method for filling microballoons which also enables the balloons to be coated on the inside surface thereof.

It is a still further object of the present invention to provide an improved method of filling microballoons with gas to pressures above atmospheric pressure.

Briefly described, the method of filling a hollow shell for use as a laser fusion target in accordance with the invention is carried out by drilling a hole through the wall of the shell. A plug having a melting temperature lower than that of the shell is then located on the shell over the hole. The plug is very small and is sometimes referred to as a microsphere hereinafter. The shell with the plug located over the hole is then placed in an evacuable pressure vessel which can be heated. In this vessel the shell can be evacuated of atmospheric gases and filled with the fill gas to the desired pressure. The gases enter and leave the shell between the plug and the perimeter of the hole. The vessel containing the shell with the plug located over the hole may then be heated to melt the plug to seal the hole. The vessel is then cooled to resolidify the plug and thus form a barrier against escape of the gas from the shell. The shell may be a glass microballoon which, when filled with the gas, provides the laser fusion target itself or the component of a more complex target configuration such as a multi-coated or multi-shelled target.

The foregoing and other objects, features and advantages of the invention as well as the best known mode for practicing the invention will be more apparent from a reading of the following description in connection with accompanying drawing in which:

FIG. 7 is a schematic diagram illustrating the step of measuring the pressure in the filled microballoon in terms of the optical path difference between two light paths reflected simultaneously back to an interferometer, one of which paths contains the microballoon.

FIG. 8 is a schematic diagram illustrating the microballoon mounted on a stalk in a laser fusion target chamber;

FIG. 9 is an enlarged fragmentary view illustrating the mounting of the stalk on the microballoon in greater detail; and FIG. 10 is a schematic diagram illustrating the step of coating the inside of the microballoon with a layer of metal.

Figure 1:
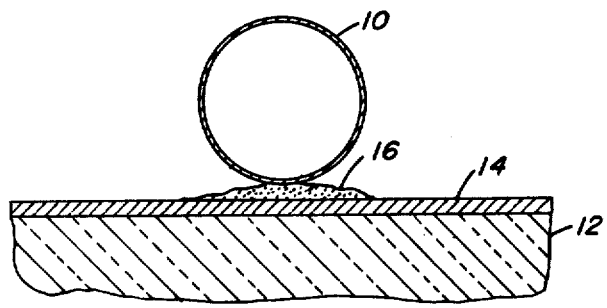
FIG. 1 is a diagram schematically showing the mounting of a microballoon on a substrate in the first step of practicing the invention in accordance with a presently preferred embodiment thereof.

Microballoons provide a convenient starting point for making laser fusion targets shell which are filled in accordance with the invention. These microballoons are thin walled hollow glass shells. The shells may have a minimum diameter of about 20 um and are available in larger diameters, e.g., 400 um. Thus, laser fusion targets in the range of 50 to 200 um in diameter may be made in accordance with the invention. These balloons may have wall thicknesses from 0.5 to 3.5 um.

To faciliate handling and drilling the microballoons, as shown in the case of an exemplary microballoon 10, they are mounted on a substrate 12. Glass is suitable for use as the substrate. This substrate is coated, as by vapor deposition with a layer 14 of optically reflective material such as 1,000 to 2,000 Angstrom thickness of gold. This layer is optically reflective in order to facilitate the use of interferometry to measure the pressure or density of the gas in the microballoon 10 after it is filled. FIG. 7 illustrates this method of measuring the pressure or density of the gas in the filled microballoon and will be discussed more fully hereinafter.

An adhesive adherent 16 is used to attach the microballoon 10 to the substrate. This adhesive may be salt (e.g., NaCl), methyl cellulose, or collodion, for example. When salt is used, a small drop of a saline solution, preferably less than the diameter of the microballoon, is placed on the surface of the reflective layer 14 and allowed to dry. The balloon 10 is placed in contact with the salt crystals. Moist air (e.g., any wet atmosphere, even the breath) causes the salt to provide a bond between the substrate and its reflective layer 14 and the balloon 10. Methyl cellulose in the form of a dilute solution in water may also be used. The surface of the layer 14 is coated with the solution and allowed to dry. The microballoon 10 is then deposited on the layer and a moist atmosphere is applied as in the case for the salt adhesive. The balloon is held by the methyl cellulose to the surface of the layer 14 on the substrate 12.

With collodion, a dilute solution in ethanol or methanol is used to coat the surface of the layer 14. After the coating dries, the microballoon is placed on the surface. Then a vapor of the alcohol is used to soften the collodion, which holds the balloon to the substrate.

Either a micromanipulator or a single camel's hair brush, or the like, may be used to transfer the microballoons to the substrate. The substrate may be mounted on a carrier to facilitate handling. Whenever the microballoons are handled, as when the microballoons are attached to the substrate as described in connection with FIG. 1, for drilling and as will be described in connection with FIG. 2 and plug location as will be described in connection with FIG. 3, these steps may be carried out at normal ambient conditions.

Figure 2:
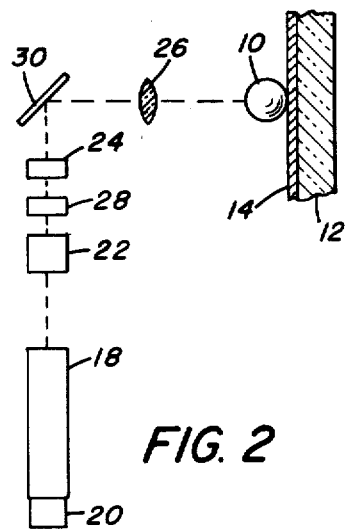
FIG. 2 is a schematic diagram illustrating the apparatus and method used for drilling a hole in the microballoon in accordance with the presently preferred embodiment of the invention.

Referring to FIG. 2, a hole next is drilled in the microballoon. The hole has a diameter from 0.5 to 2.5 um and is preferably one um or less in diameter. The smaller hole results in less perturbation in the surface of the microballoon after it is plugged and less force on the plug which might tend to set up stresses therein and break the seal. Such small holes may have aspect ratios (ratio of depth to diameter) as high as three to one. Typically, with a wall thickness of one micrometer, a suitable hole diameter may be also one micrometer which provides an aspect ratio of approximately one to one. Such small holes are usually smaller than the diffraction limited spot size of the laser beam used to drill the hole. This phenomena is due to the fact that the hole is drilled with a laser pulse having a duration of less than 100 psec. Use of the short pulse length permits routine fabrication of high aspect ratio holes smaller than the plane wave diffraction limited laser spot size(D):

$$D = 1.22 \; (\text{-lamda-})/N.A.$$

where (-lamda-) is the wavelength of the light and N.A. is the numerical aperture of the focusing optics. Such holes have been produced with single pulses as well as with a train of approximately 20 pulses each less than 100 psec. In duration and separated from each other by 2-10 nsec. As shown in FIG. 2, pulses used to drill microballoons are obtained from an active-passive mode locked oscillator 18 operating at a wavelength of 1.054 um. For further information as to the operation of the active-passive mode locked oscillator see, Reproducible Active-Passive Mode Locked Oscillators, by W. Seka and J. Bunkenburg; 14.1 IEEE/OSA CLEA (1977), and Active-Passive Mode Locked Oscillators at 1.054 um by W. Seka and J. Bunkenburg; J. Appl. Phys 49, 7 (April 1979) p. 2277. A pulse train passes out of the oscillator 18 through a Pockels cell 22 which can be set to selectively pass a single pulse or adjusted to pass the full pulse train. Optionally the beam is frequency doubled to 0.527 um with a KDP crystal 28 which is set in the beam line after the Pockels cell 29. The beam is routed through neutral density filters 24 which are adjusted to vary the energy in the laser pulse used to drill the microballoon 10. Finally the beam is steered via a set of turning mirrors 30 into the focusing optics 26 and brought onto the top surface of the microballoon 10 which is held on the substrate 12. To insure that the beam is focused on the top surface of the microballoon 10 the focusing optics 26 are prealigned using either a CW HeNe or YAG alignment laser 20 which runs colinear with the pulsed beam. Table 1 compares some of the smaller holes drilled with the plane wave approximation for the diffraction limited focal spot. The ability to drill small holes with high aspect ratios in presently believed to be due to the use of laser pulse lengths shorter than 100 psec.

TABLE 1

| | Dimensions of Smallest Holes | | | |
|---|---|---|---|---|
| Glass Thickness | Laser Wavelength | Plane Wave Approximation Diffraction Lmtd. focal spot size($\mu$m) | Characteristic Hole Dimension($\mu$m) | Aspect Ratio |
| 1.2 | 1.054 | 3.2 | .7 | 1.6 |
| 3.5 | 1.054 | 3.2 | 1.0 | 3.5 |
| 1.1 | 1.054 | 6.5 | 1.5 | .7 |
| 1.0 | .527 | 1.6 | .3 | 3.0 |

Figure 3:
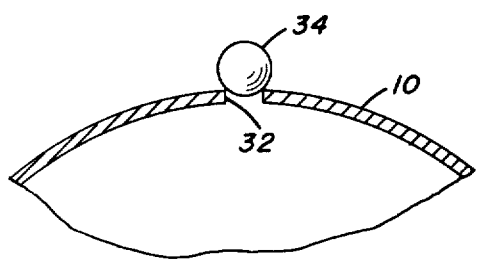
FIG. 3 is an enlarged fragmentary sectional view illustrating a portion of the microballoon with a microsphere disposed as a plug on the wall of the microballoon over the drilled hole.

FIG. 3 shows the empty microballoon 10 having a hole 32 with a microsphere plug 34 thereon. The hole may, for example, be one micrometer in diameter. The diameter of the microsphere plug 34 may, for example, may be 2 um.

The plug may be transferred to the microballoon and placed thereon over the hole 32 by a micromanipulator. The plug may first be placed on the under side of a flat glass substrate. If the plug is irregularly shaped the microballoon is preferably moistened to provide a water film which aids the transfer. The plug on the transparent glass substrate and the microballoon on its reflective substrate 12 are each micromanipulated separately using viewing optics. The limited depth of field of the optics assists in determining the height of the plug over the microballoon. The plug is then positioned over the hole and brought in contact. Once the plug is on the hole, it adheres more to the microballoon than to the substrate so that the substrate on which the plug is carried for transfer to the microballoon may be removed.

The plug is selected to be of material having a melting temperature, by which is meant a temperature at which the material of the plug flows, which is lower than the melting point of the glass microballoon. Thermoplastic materials may be used to provide the plugs. The plug is preferably a spherical latex material such as that globules are formed by emulsion polymerization. Polystyrene latices are preferred. The polystyrene is preferably of high fractional crystallinity. In other words a high fraction of the polystyrene is crystaline rather than amorphous. A crystalline material provides a much better matrix than an amorphous material to limit diffusion of gas through the plug after it has melted to form a seal. A high molecular weight polymer is preferred. Such polymers which have high fractional crystallinity are characterized by a higher melting point than low molecular weight amorphous polymers (e.g., from 200° C. to 260° C. rather than from about 100° to 160° C.).

The plug may also be made of glass with a low melting point; preferably solder glass. Solder glass is commercially available and is used extensively in the microelectronics industry to form dielectric seals over integrated circuits. Solder glass is available in the form of glass frit. It is desirable that this frit be spheroidized as by dropping it through a hot zone; however this is not necessary.

Either glass microspheres or thermoplastic latex microspheres are both suitable plug materials for use in practicing the invention. The advantage of the glass plugs is that the pressure retention which is provided by seals formed from such plugs is greater than obtained with thermoplastic plugs. For example the pressure retention half life of argon sealed with a polystyrene plug in a 50 um diameter microballoon is from 15 to 30 hours. This retention time may be increased by storing the filled microballoons in a pressurized canister filled with argon. The microballoons are removed from the canister immediately before they are used as laser targets. A glass plug, for example, sealing argon in a 50 um microballoon provides a pressure retention half life of several months; thus storage in a pressure canister is not required.

Figure 4:
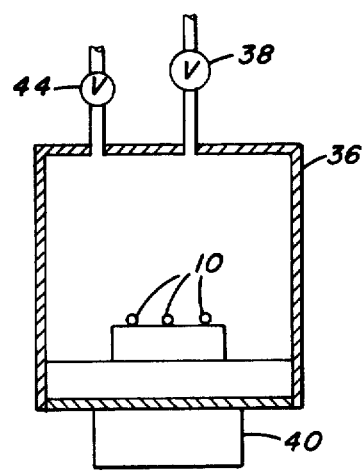
FIG. 4 is a schematic diagram illustrating the step of filling the microballoons with gas while situated in a pressure vessel.
Figure 5:
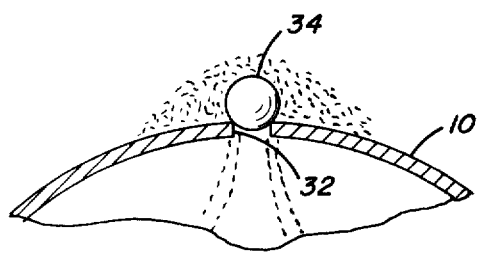
FIG. 5 is an enlarged view of one of the microballoons as it is being filled with gas in the pressure vessel shown in FIG. 4.

The microballoons are filled using a pressure canister or vessel 36 as shown in FIG. 4. The microballoons with microsphere plugs over their drilled holes are transferred with their substrates and carrier blocks into the pressure vessel 36. The vessel is first evacuated and then is filled with pressurized gas through a valve 38. The pressure may be increased gradually so as to limit forces on the plug which might establish stresses therein. As the pressure increases the gas flows around the microsphere plug 34 and between the plug and the of periphery the hole 32 as shown in FIG. 5.

Figure 6:
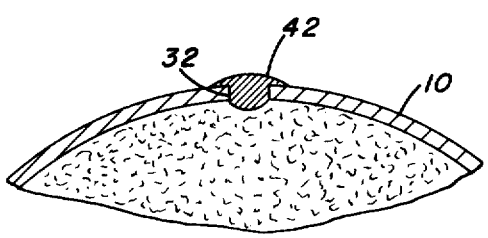
FIG. 6 is an enlarged fragmentary view showing the filled microballoon after the microsphere plug has been melted to form a seal in the drilled hole.

When the microballoons are filled to the requisite pressure, and while that pressure is still applied, the microballoons with the microsphere plugs are heated, as by heating the pressure vessel 36 with the aid of a heater 40. The plug melts and the melted plug forms a seal 42 in the hole 32 of the filled microballoon 10 as shown in FIG. 6. The melted microsphere plug minimally perturbs the surface finish of the microballoon. Typically the bump in the surface due to the melted plug 42 is only from 1,000 to 5,000 Angstroms above the surface and has a width of from 2 to 4 um. After the seal is formed, the microballoons are cooled to ambient temperature and the pressure vessel may be vented to the atmosphere through a valve 44.

The method provided by the invention permits filling of the microballoon with gases other than those which can permeate through the glass shell of the microballoon. Hydrogen, neon and helium gas and the isotopic and ionic forms thereof can permeate through the shell of the glass microballoon. Argon can also be permeated through a few types of microballoons. However, the diffusion process is inconveniently slow and may take several weeks to accomplish. By virtue of the present invention every gas in addition to these three gases may also be used to fill microballoons since they are introduced into the balloon via the hole which is drilled therein. Other gases which are important for use in laser fusion targets may include argon, deuterium sulphide ($D_2S$) and Xenon (Xe). In addition, fluids may be introduced through the drilled hole as for example by glass micropipette which is micromanipulated into the hole. The plug is then placed on the microballoon over the hole after filling with the fluid.

As shown in FIG. 10, a coating or layer may be placed on the inside of the balloon prior to filling through the use of the drilled hole. For example a coating of nickel or other metal may be provided by inserting a filament 46 through the hole 32 drilled into the microballoon 10. Current from a current source 48 vaporizes the filament within the confines of the microballoon 10 so that the vapor spreads out over the inside of the microballoon 10 to form a coating thereon.

A chemical vapor deposition may also be used. For example to obtain a nickel coating, a nickel carbonyl gas may be used. The microballoon is then located in a canister which is filled with nickel carbonyl gas. The gas enters the drilled hole 32 and on heating, the gas decomposes and coats the inside of the microballoon with nickel. The coating formed on the outside of the microballoon may be removed by etching, preferably after the balloon has been filled with its intended fill gas (e.g. a deuterium-tritium mixture), and sealed. A glass plug is preferably used when etching the nickel film from the outside of the balloon is to be performed.

Other deposition techniques can also be used for coating the inner surface of a hollow shell target. For example, it is known that laser photodeposition of organometallic compounds can produce metal films of aluminum, cadmium, tin, zinc, etc. (see Laser Photodeposition of Metal Films with Microscopic Features, by T. F. Deutsch, et al., Appl. Phys. Lett. 35, 175 (1979)) Thus an organometallic vapor (e.g. trimethylaluminum) may be introduced through the hole in a microballoon, entrapped therein by means of the herein described plugging method, and photodissociated by a suitable light source such as a uv-laser. This would yield a microballoon target with a metal coating on its inner surface. If desired, the glass could be etched away to produce a free-standing shell of the metal.

Optical interferometry is used to measure the pressure of the gas which has been entrapped and sealed within the microballoon (see FIG. 7). An interferometer 50 is used to measure the optical path difference between two light paths 54, 56 reflected back to the interferometer one of which contains the microballoon. This optical path difference is the optical path length through the microballoon. The interferometer 50 be used first to measure the optical path through the empty balloon, using the double-pass configuration shown in FIG. 7. After the balloon has been filled with gas by the method of the present invention, the optical path is remeasured. The change in optical path is equal to $(n_g-1)D$ where D is the inside diameter of the microballoon and $n_g$ is the index of refraction of the gaseous fill. The index of refraction is related to the gas pressure, P, by the expression:

$$(n_g-1)=kP$$

ps where k is a constant which is characteristic of the gas; for example, $k=0.000281$ for argon. Thus a change in optical path of 0.20 um with $D=50$ um would correspond to an argon fill pressure of 14.2 atm. Accordingly the pressure of the gas in the microballoon and, therefore, the gas density may be determined by this simple and accurate method. Such pressure measurement is used in order to verify the integrity of the gas seal.

It may be desirable to refill the microballoon with gas prior to use as a laser fusion target. Such refilling may be desirable when thermoplastic microsphere plugs are used. In refilling, the microballoons are returned to the canister. The pressure of the gas in the canister is raised slowly until the desired fill pressure is reached. The microballoons are refilled by diffusion through the thermoplastic plug. The pressure in the balloon may be verified after removal from the pressure canister by interferometry, as explained above in connection with FIG. 7.

Balloons may be filled and sealed to contain high pressures. The pressure to which the balloon may be filled is not limited by the plug, since ruptures of the plug are due to the stress failures. Stress failures require high force. Even though the pressure on the plug is high, the area of the plug is very small, so that the force thereon is correspondingly small. It has been found, for example, that glass microballoons from 50 to 200 um diameter can be pressurized and plugged to hold over 100 times atmospheric pressure.

In order to mount the filled microballoons as targets as in a target chamber 60 of a fusion laser system (FIG. 8), a glass fiber stalk 62 may be used. The top of the stalk 62 is disposed in contact with the plug 42 and thus covers the small area in which the surface finish of the microballoon is somewhat perturbed (see FIG. 9). The beam or beams from the fusion laser are made incident on the filled microballoon which functions as a laser fusion target.

From the foregoing description it will be apparent that there has been provided an improved method for making laser targets and particularly for filling glass microballoon targets with gases which have heretofore been difficult or impossible to be used to fill such targets. Variations and modifications of the herein described method, within the scope of the invention, will undoubtedly suggest themselves to those skilled in the art. Accordingly the foregoing description should be taken as illustrative and not in any limiting sense.

What is claimed is:

1. The method of filling a laser target having a hollow shell with gas which comprises the steps of drilling a hole through the wall of the shell, locating a plug having a melting temperature lower than that of the shell over the hole, placing the drilled shell with the plug in a vessel, introducing the gas into the shell through the hole while the plug is located on the shell over the hole, heating the vessel, thereby melting the plug to seal the hole to form a barrier against the escape of the gas from the shell thereby providing a gas-filled shell, removing said gas-filled shell from said vessel, and mounting said shell upon a stalk with the top of the stalk and the melted plug in contact with each other to provide an assembly for use in a laser fusion target chamber.

2. The method as set forth in claim 1 wherein said shell is a glass microballoon and further comprising the step of mounting said microballoon on a substrate having a light reflective layer thereon and testing said microballoon on said substrate.

3. The method as set forth in claim 2 wherein said step of testing comprises interferometrically measuring the optical path length of light which passes through said microballoon and is reflected by said layer thereby indicating the pressure of said gas contained in said microballoon.

4. The method as set forth in claim 1 further comprising the step of introducing material for coating the inside of said shell through said hole, and coating said shell on the inside thereof with said material.

5. The method as set forth in claim 1 wherein said drilling step is carried out by directing a beam of laser radiation in the form of at least one pulse which is less than 100 psec in duration to produce a high aspect ratio hole which is smaller than the plane wave diffraction limited focal spot size.

6. The method as set forth in claim 1 wherein said plug is a sphere.

7. The method as set forth in claim 6 wherein said sphere is of spherical latex material.

8. The method as set forth in claim 1 wherein said plug is selected from material in the group consisting of glass and thermoplastic material.

9. The method as set forth in claim 8 wherein said material of said plug is solder glass.

10. The method as set forth in claim 8 wherein said plug material is a polymer thermoplastic material having fractional crystallinity therein sufficient to limit the diffusion of the gas through the plug.

11. The method as set forth in claim 10 wherein said polymer thermoplastic is polystyrene of high fractional crystallinity.

12. The method as set forth in claim 1 wherein said step of introducing said gas is carried out by placing said drilled shell with said plug thereon in a vessel, introducing gas into said vessel and thereby allowing said gas to permeate through said hole around said plug.

13. The method as set forth in claim 12 wherein said gas is introduced into said vessel at greater than atmospheric pressure.

14. The method as set forth in claim 13 wherein said melting step is carried out while said pressurized gas is contained in said vessel.

15. The method as set forth in claim 14 further comprising reducing the pressure in said vessel to atmospheric pressure after said plug has melted and has formed said seal.

16. The method as set forth in claim 1 wherein said shell is a glass microballoon having an outside diameter from about 50 to 400 um and a wall thickness from about 0.5 to 3.5 um and further comprising the step of mounting said microballoon on a substrate with the aid of an adhesive selected from the group consisting of hydroscopic salt, methyl cellulose and collodion prior to said drilling step, and carrying said microballoon on said substrate during said drilling, plug locating, and plug melting steps.

* * * * *